United States Patent [19]

Ohta et al.

[11] Patent Number: 4,685,850
[45] Date of Patent: Aug. 11, 1987

[54] TOOL AND WORKPIECE CHANGE SYSTEM

[75] Inventors: Takeshi Ohta, Nishio; Hiroshi Nakamura, Kariya; Kazushi Murata, Nishio, all of Japan

[73] Assignee: Toyoda Koki Kabushiki Kaisha, Kariya, Japan

[21] Appl. No.: 779,441

[22] Filed: Sep. 24, 1985

[30] Foreign Application Priority Data

Sep. 24, 1984 [JP] Japan .................... 59-199757

[51] Int. Cl.$^4$ .............................. B65H 1/00
[52] U.S. Cl. ........................... 414/225; 414/222; 414/223; 901/7
[58] Field of Search ............... 414/222–225, 414/783, 730, 732, 739; 901/29, 7

[56] References Cited

U.S. PATENT DOCUMENTS

| | | | |
|---|---|---|---|
| 4,042,122 | 8/1977 | Espy et al. | 414/783 X |
| 4,164,290 | 8/1979 | Zankl | 414/732 X |
| 4,274,779 | 6/1981 | Longinotti | 414/225 X |
| 4,275,986 | 6/1981 | Engelberger et al. | 414/732 X |
| 4,359,815 | 11/1982 | Toyoda | 414/225 X |
| 4,373,840 | 2/1983 | Miller, Jr. | 414/225 |

FOREIGN PATENT DOCUMENTS

56-69056 6/1981 Japan .
57-19484 2/1982 Japan .

*Primary Examiner*—Robert J. Spar
*Assistant Examiner*—Jay I. Alexander
*Attorney, Agent, or Firm*—Oblon, Fisher, Spivak, McClelland, & Maier

[57] ABSTRACT

A tool and workpiece change system adapted to a machining center with a tool magazine and a pallet pool having a pallet change station and a pallet loading and unloading station and associated with a pallet change apparatus for replacing a pallet on a worktable in the machining center with another pallet successively positioned at the pallet change station. The system comprises a replaceable hand support arranged adjacent the loading and unloading station to detachably support a first replaceable hand for grasping a workpiece and a second replaceable hand for grasping a cutting tool, a workpiece support arranged adjacent the hand support, a tool support arranged adjacent the workpiece support to detachably support a plurality of spare cutting tools, and a robot arranged to be movable between first and second spaced positions. The robot is equipped with the first replaceable hand in the first position for replacing a finished workpiece on a pallet unloaded to the loading and unloading station with a fresh workpiece on the workpiece support and is further equipped with the second replaceable hand in the first position and moved to the second position for replacing a defective or damaged cutting tool in the tool magazine with a spare cutting tool of the same type on the tool support.

3 Claims, 7 Drawing Figures

TOOL AND WORKPIECE CHANGE SYSTEM

BACKGROUND OF THE INVENTION

1. Field of the Invention

The present invention relates to a tool and workpiece change system adapted to a numerically controlled machining center and a pallet pool for replacing a finished workpiece unloaded from the pallet pool with a fresh workpiece and for replacing a defective or damaged cutting tool in a tool magazine of the machining center with a spare cutting tool of the same type.

2. Discussion of the Background

In a conventional system for automatically replacing a finished workpiece on a pallet unloaded from a pallet pool with a fresh workpiece on a workpiece support and for automatically replacing a defective or damaged cutting tool in a tool magazine of a machining center with a spare cutting tool of the same type on a tool support, it is required to provide two robots which are respectively equipped with a hand for grasping a workpiece and a hand for grasping a cutting tool. Such provision of the two robots results in increase of the manufacturing cost of the system.

SUMMARY OF THE INVENTION

It is, therefore, a primary object of the present invention to provide a tool and workpiece change system wherein a single robot is arranged to replace a finished workpiece on a pallet unloaded from a pallet pool with a fresh workpiece on a workpiece support and to replace a defective or damaged cutting tool in a tool magazine of a machining center with a spare cutting tool on a tool support.

According to the present invention, there is provided a tool and workpiece change system adapted to a numerically controlled machining center with a tool magazine and a pallet pool having a pallet change station and a pallet loading and unloading station and associated with a pallet change apparatus for replacing a pallet on a worktable in the machining center with another pallet successively positioned at the pallet change station. The tool and workpiece change system comprises a replaceable hand support arranged adjacent the loading and unloading station of the pallet pool to detachably support thereon a first replaceable hand for grasping a workpiece and a second replaceable hand for grasping a cutting tool, a workpiece support arranged adjacent the replaceable hand support, a tool support arranged adjacent the workpiece support to detachably support thereon a plurality of spare cutting tools, and a robot arranged to be movable between first and second spaced positions, the robot being adapted to be equipped with the first replaceable hand in the first position for replacing a finished workpiece on a pallet unloaded to the loading and unloading station of the pallet pool with a fresh workpiece on the workpiece support and being adapted to be equipped with the second replaceable hand in the first position and moved to the second position for replacing a defective or damaged cutting tool in the tool magazine with a spare cutting tool of the same type on the tool support.

BRIEF DESCRIPTION OF THE DRAWINGS

Additional objects and advantages of the present invention will become more readily apparent from the following detailed description of a preferred embodiment thereof when considered with reference to the accompanying drawings, in which.

DESCRIPTION OF THE PREFERRED EMBODIMENT

Figure 1:
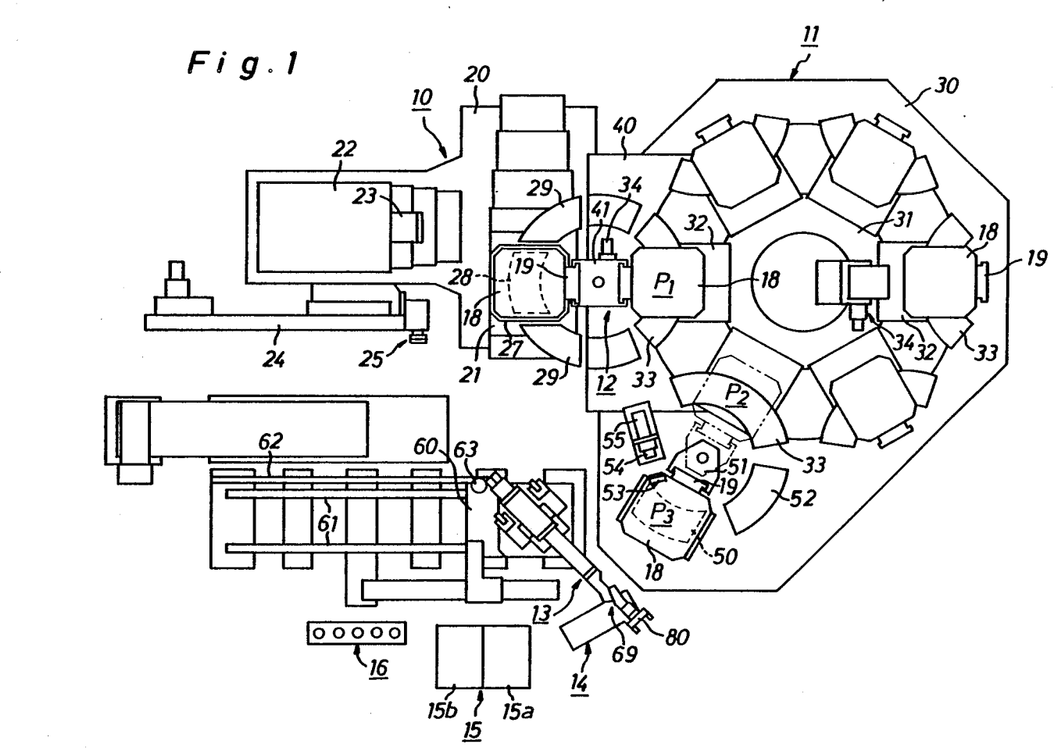
FIG. 1 is a plan view illustrating a tool and workpiece change system in accordance with the present invention.

Referring now to the drawings, FIG. 1 illustrates a tool and workpiece change system adapted to a numerically controlled machining center 10 and a pallet pool 11 adjacent the same. In the system, a pallet change apparatus 12 is arranged between the machining center 10 and the pallet pool 11, and a computer controlled industrial robot 13 is arranged adjacent a replaceable hand support 14, a workpiece support 15 and a tool support 16. The machining center 10 includes a table 21 mounted on a bed 20 for horizontal movement, an upright column 22 mounted on the bed 20 for horizontal movement in a direction perpendicular to the table 21, a spindle head 23 mounted on the upright column 22 for vertical movement, a tool magazine 24 adapted to store a plurality of cutting tools and to transfer the tools to the spindle of spindle head 23 and vice versa, and a tool changer 25 associated with the tool magazine 24 to replace a defective tool with a fresh tool in a usual manner. A worktable 27 is rotatably mounted on the table 21 to be indexed to a predetermined position, and a semicircular clamp rail 28 is mounted on the worktable 27 for vertical movement. A pallet 18 is slidably mounted on the clamp rail 28 to be clamped on the worktable 27 when the clamp rail 28 is moved downward and to be unclamped when the clamp rail 28 is moved upward. A pair of opposed semicircular guide rails 29 are further mounted on the worktable 27 adjacent opposite sides of the clamp rail 28. When it is required to replace the pallet 18 with the following pallet 18, the table 21 is positioned at a place corresponding to a pallet change station $P_1$ of the pallet pool 11.

The pallet pool 11 includes a frame 30 arranged in front of the table 21, a rotary plate 31 mounted on the center of frame 30 for rotation in a horizontal plane, and a plurality of circumferentially equi-spaced pallet carriers 32 mounted on the peripheral portion of rotary plate 31 for rotation therewith. The pallet carriers 32 each are provided thereon with a semicircular support rail 33 which is adapted to slidably receive the pallet 18 upon which a workpiece (not shown) is clamped as described later. When the rotary plate 31 is driven by a conventional index drive mechanism 34, the support rail 33 on each of the pallet carriers 32 is successively indexed to the pallet change station $P_1$ where a circular guide way is completed by the indexed support rail 33 when the worktable 27 is positioned to effect upward movement of the clamp rail 28 for change of the pallet 18.

The pallet change apparatus 12 includes a support table 40 arranged between the table 21 of machining center 10 and the pallet change station $P_1$ of pallet pool 11, and a first rotary arm 41 mounted on the support table 40 for rotation in a horizontal plane and vertical movement. The first rotary arm 41 is provided at opposite ends thereof with a pair of hooks which are adapted to be engaged with a block 19 of the pallet 18 on the worktable 27 and with a block 19 of the indexed pallet 18 in the pallet change station $P_1$. When the first rotary arm 41 is moved upward, the hooks of rotary arm 41 are positioned to permit rotation of the pallets 18 in the pallet pool 11. When the rotary arm 41 is moved downward in a condition where the table 21 of machining center 10 is positioned for change of the pallet 18, the hooks of rotary arm 41 are engaged with the block 19 of the pallet 18 on the worktable 27 and the block 19 of the indexed pallet 18 at the pallet change station $P_1$.

Arranged on the frame 30 of pallet pool 11 are a pallet unloading station $P_2$ adjacent the pallet change station $P_1$, and a pallet loading station $P_3$ opposed to the pallet unloading station $P_2$. A semicircular stationary rail 50 is mounted on the frame 30 to slidably receive the pallet 18 at the loading station $P_3$, and an intermediate semicircular rail 52 is mounted on the frame 30 to provide a semicircular guide way between the unloading and loading stations $P_2$ and $P_3$. At the center of the semicircular guide way, a second rotary arm 51 is mounted on the frame 30 for rotation in a horizontal plane and for vertical movement. The second rotary arm 51 is provided at one end thereof with a hook which is adapted to be engaged with the block 19 of the pallet 18 at the unloading station $P_2$. When the second rotary arm 51 is moved downward at the unloading station $P_2$, the block 19 of pallet 18 on the support rail 33 is engaged with the hook of rotary arm 51 and subsequently transferred by rotation of the rotary arm 51 to the loading station $P_3$. In this embodiment, the pallets 18 each are provided thereon with a hydraulic clamp unit (not shown) for clamping the workpiece by hydraulic fluid under pressure. As is illustrated at the loading station $P_3$, the hydraulic clamp unit has a joint 53 which is arranged to be connected to a joint block 54. The joint block 54 is carried on a hydraulic actuator 55 for movement toward and away from the joint 53 of the hydraulic clamp unit on the pallet 18 positioned at the loading station $P_3$. The joint block 54 is connected to a pump unit (not shown) which is adapted to supply the hydraulic fluid under pressure to the clamp unit for clamping the workpiece on the pallet 18 and to permit discharge of the hydraulic fluid under pressure from the clamp unit for unclamping the workpiece on the pallet 18.

The industrial robot 13 is mounted on a wheeled transfer table 60 which is movably mounted on a pair of parallel rails 61. The parallel rails 61 are arranged on the floor in parallel with the tool magazine 24 of machining center 10 and adjacent the loading station $P_3$ of pallet pool 11 at their one ends. A rack bar 62 is further arranged on the floor in parallel with the rails 61. The transfer table 60 is equipped with a prime mover 63 which has an output shaft integral with a pinion in mesh with the rack bar 62. Thus, the transfer table 60 can be moved by operation of the prime mover 63 to transfer the robot 13 to a position opposed to the tool magazine 24 and to a position opposed to the loading station $P_3$ of pallet pool 11.

Figure 2:
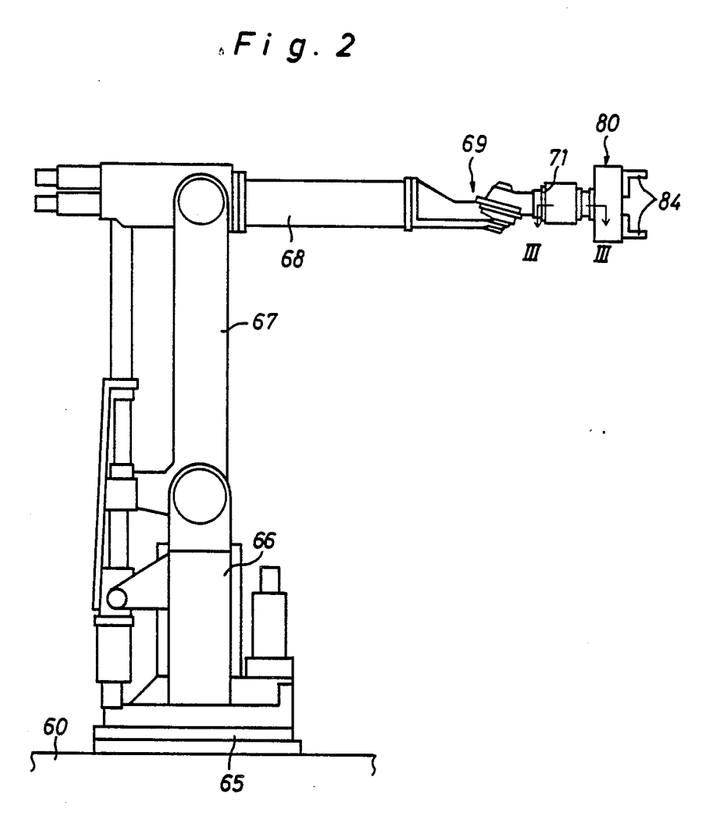
FIG. 2 illustrates a computer controlled industrial robot.
Figure 3:
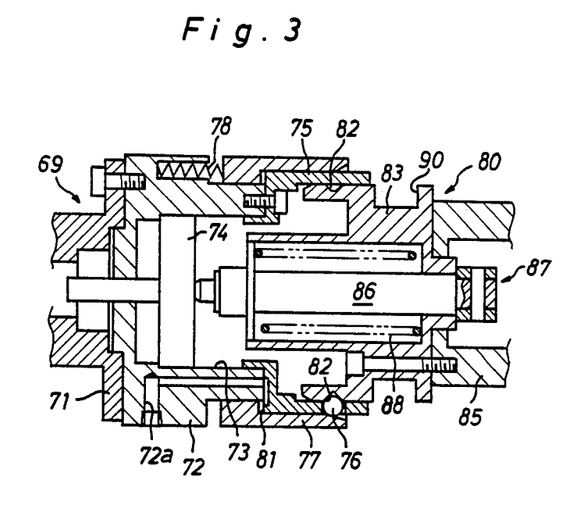
FIG. 3 is an enlarged sectional view taken along line III—III in FIG. 2.

As shown in FIG. 2, the industrial robot 13 has a base 65 secured to the transfer table 60, a rotary table 66 mounted on the base 65 for rotation in a horizontal plane, a shoulder section 67 rotatably mounted on the rotary support 66 to be moved in a vertical plane, a forearm section 68 rotatably mounted on the shoulder section 67 to be moved in a vertical plane, a wrist joint 69 connected to the forearm section 68 and having a freedom of movement along two or three control axes, and a replaceable hand 80 detachably connected to the wrist joint 69 for grasping a tool or a workpiece. As shown in FIG. 3, the wrist joint 69 has a mounting flange 71 secured thereto and a cylinder body 72 secured to the flange 71. The cylinder body 72 is formed therein with a cylinder bore 73 in which a piston 74 is slidably disposed to be moved by an actuator (not shown). A support sleeve 75 is secured to one end of the cylinder body 72, and a fastening sleeve 77 is slidably coupled over the support sleeve 75. The support sleeve 75 is formed in its peripheral wall with a plurality of circumferentially equi-spaced radial holes in which a plurality of balls 76 are movably retained. The fastening sleeve 77 is biased by a compression spring 78 to press the balls 76 radially inwardly by engagement therewith so as to clamp the replaceable hand 80. When an annular space 81 between the sleeves 75 and 77 is applied with a pneumatic pressure through a passage 72a, the fastening sleeve 77 is moved against the compression spring 78 to release the pressure acting on the balls 76 so as to permit release of the replaceable hand 80 from the wrist joint 69.

Figure 5:
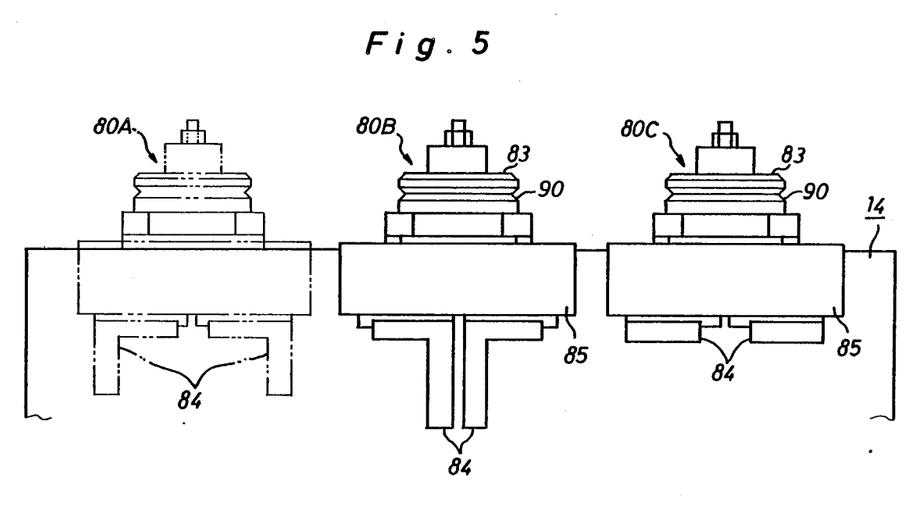
FIG. 5 is a front view of the replaceable hand support.

The replaceable hand 80 has a cylinder body 83 slidably coupled within the support sleeve 75, and a support block 85 secured to the cylinder body 83. The cylinder body 83 is formed at its outer periphery with a plurality of circumferentially equi-spaced radial recesses 82 for engagement with the balls 76. An operation rod 86 is axially slidably supported on the cylinder body 83 and engaged with the piston 74 under load of a compression spring 88. As shown in FIG. 5, the support block 85 is provided with a pair of grasping members 84 which are connected to the operation rod 86 by means of a linkage 87 in such a manner that the grasping members 84 are opened when the operation rod 86 is maintained in an original position under the load of compression spring 88. When the operation rod 86 is moved by the piston 74 against the compression spring 88, the grasping members 84 are closed to grasp a cutting tool or a workpiece as described later.

Figure 4:
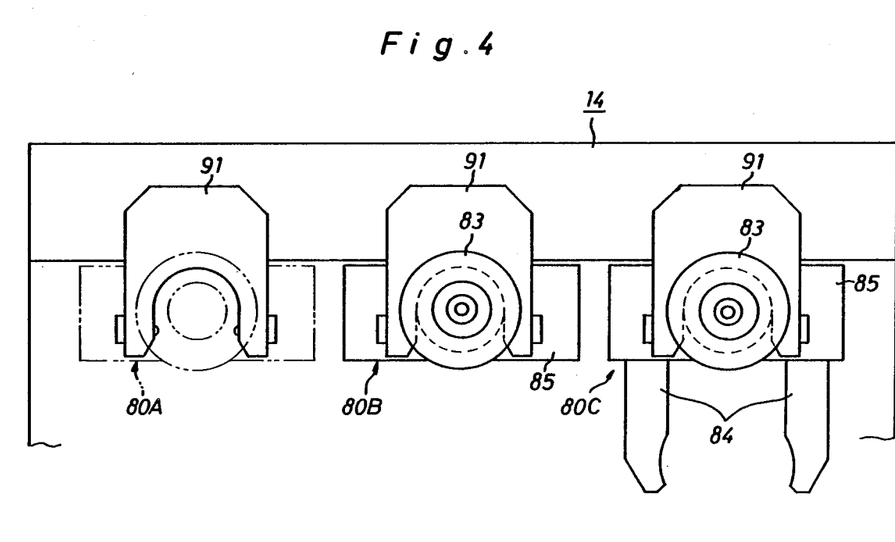
FIG. 4 is an enlarged plan view of a replaceable hand support shown in FIG. 1.
Figure 6:
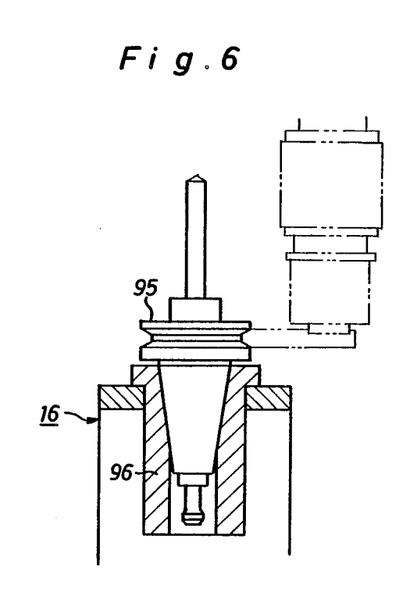
FIG. 6 is an enlarged sectional view of a portion of a tool support shown in FIG. 1.

As shown in FIGS. 4 and 5, the replaceable hand 80 is prepared as three different kind of replaceable hands 80A, 80B and 80C which are respectively adapted to grasp the outer periphery of a workpiece, the inner periphery of a workpiece, and a cutting tool. The hand support 14 is provided thereon with three spaced fork members 91 which are arranged to detachably support the replaceable hands 80A, 80B and 80C at their annular grooves 90. The tool support 16 is arranged adjacent to the tool magazine 24 of machining center 10 through the rails 61. As shown in FIG. 6, the tool support 16 is provided thereon with a plurality of tool sockets 96 which are arranged to detachably support a plurality of spare cutting tools 95 thereon. The spare cutting tools 95 are stored to be replaced with a defective or damaged cutting tool in the tool magazine 24.

Hereinafter, the operation of the above embodiment will be described. Assuming that cutting of a workpiece on one of the pallets 18 has finished in the machining center 10 in a condition where the following pallet 18 is positioned at the pallet change station $P_1$ of pallet pool 11, the table 21 is positioned at the predetermined position for change of the pallet 18, and subsequently the clamp rail 28 is moved upward to unclamp the pallet 18. Thus, the clamp rail 28 is associated with the support rail 33 on the pallet carrier 32 to complete the circular guide way. In such a condition, the first rotary arm 41 is moved downward so that the hooks of rotary arm 41 are engaged with the blocks 19 of the opposed pallets 18. Subsequently, the first rotary arm 41 is rotated for 180° to replace the pallet 18 on the worktable 27 with the pallet 18 on the pallet carrier 32. Thereafter, the clamp rail 28 is moved downward to clamp the replaced pallet 18 on the worktable 27, while the first rotary arm 41 is moved upward to disengage the blocks 19 of pallets 18 from its hooks. Thus, the table 21 is moved to a position for cutting a workpiece clamped on the replaced pallet 18.

After the unloaded pallet 18 is disengaged from the first rotary arm 41 at the pallet change station $P_1$, the rotary plate 31 is rotated by activation of the index drive mechanism 34 to transfer the unloaded pallet 18 to the unloading station $P_2$. When the unloaded pallet 18 is positioned at the unloading station $P_2$, the second rotary arm 51 is moved downward so that the hook of rotary arm 51 is engaged with the block 19 of pallet 18. Subsequently, the second rotary arm 51 is rotated for 180° to transfer the unloaded pallet 18 to the loading station $P_3$. After the unloaded pallet 18 is positioned at the loading station $P_3$, the hydraulic actuator 55 is activated to connect the joint block 54 with the joint 53 on the unloaded pallet 18 so as to unclamp a finished workpiece on the unloaded pallet 18. In such a situation, the robot 13 is positioned adjacent the loading station $P_3$ and is activated to grasp the finished workpiece by the hand 80A mounted thereto and to transfer the same to an unloading place 15a on the workpiece support 15. Subsequently, the robot 13 is activated to grasp a fresh workpiece on a loading place 15b of support 15 and to transfer the same to the loading station $P_3$ of pallet pool 11.

After the fresh workpiece is positioned at the loading station $P_3$, the hydraulic clamp unit on the unloaded pallet 18 is operated by the hydraulic fluid under pressure supplied thereto from the pump unit to clamp the fresh workpiece, and subsequently the actuator 55 is activated to disconnect the joint block 54 from the joint 53 of the clamp unit. In such a situation, the second rotary arm 51 is rotated for 180° to return the unloaded pallet 18 to the unloading station $P_2$ and is moved upward to disengage the pallet 18 therefrom. Thereafter, the rotary plate 31 is rotated by activation of the index drive mechanism 34 to transfer the following pallet 18 to the pallet change station $P_1$.

In the case that during the above-described process, a different kind of finished workpiece is unloaded to the loading station $P_3$ from the unloading station $P_2$, the robot 13 is controlled by a command signal from a computer (not shown) to replace the hand 80A with another hand 80B. When applied with the command signal, the robot 13 is operated to return the hand 80A to a predetermined position on the hand support 14 and to engage it with the corresponding fork member 91 on the support 14 at its annular groove 90. In such a condition, a pneumatic pressure is applied to the annular space 81 between the sleeves 75 and 77 of the wrist joint 69 to move the fastening sleeve 77 against the compression spring 78. As a result, the hand 80A is supported by the fork member 91 and released from the wrist joint 69 in its upward movement. Subsequently, the robot 13 is operated to couple the wrist joint 69 with the cylinder body 83 of hand 80B, and the pneumatic pressure is exhausted from the annular space 81 between the sleeves 75 and 77 to effect outward movement of the fastening sleeve 77 under the load of compression spring 78. Thus, the hand 80B is clamped at its cylinder body 83 by engagement with the balls 76 to carry out the following processes.

Figure 7:
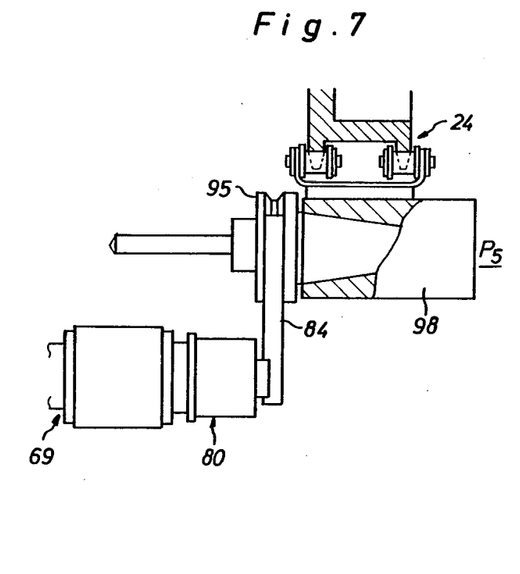
FIG. 7 is an enlarged sectional view of a portion of a tool magazine shown in FIG. 1.

If a cutting tool is damaged during machining operation of the machining center 10, a tool socket 98 of the damaged cutting tool will be indexed to a tool change position $P_5$ of the tool magazine 24, as is illustrated in FIG. 7. In this situation, the robot 13 is operated to replace the workpiece grasping hand 80A or 80B with the tool grasping hand 80C in such a manner as described above. Thereafter, the transfer table 60 is moved along the rails 61 by activation of the prime mover 63 to displace the robot 13 to a position opposed to the tool change position $P_5$ of tool magazine 24. In the displaced position, as is illustrated in FIGS. 6 and 7, the hand 80C of robot 13 is operated to grasp the damaged cutting tool 95 and remove it from the tool socket 98. The hand 80C of robot 13 is subsequently operated to engage the damaged cutting tool 95 with an empty tool socket 96 on the tool support 16 and is moved to grasp a spare cutting tool of the same type supported on another tool socket 96 on the tool support 16. Thus, the hand 80C of robot 13 is further operated to remove the spare cutting tool from the tool socket 96 and to engage it with the empty tool socket 98 located at the tool change position $P_5$ of tool magazine 24.

Although the present invention has been described in conjunction with the preferred embodiment, it is to be understood that modifications and variations may be resorted to without departing from the spirit of the invention as those skilled in the art will readily understand. Such modifications and variations are considered to be within the view and scope of the present invention as defined by the appended claims.

What is claimed is:

1. A tool and workpiece change system for a numerically controlled machining center with a pallet pool, said machining center being provided with a tool magazine for storing cutting tools, and said pallet pool having a pallet change station and a workpiece loading and unloading station and being associated with a pallet change apparatus arranged to replace a pallet on a worktable of said machining center with another pallet successively positioned at the pallet change station, wherein the tool and workpiece change system comprises:

a replaceable hand support arranged adjacent the workpiece loading and unloading station of said pallet pool to removably support thereon a first replaceable hand for grasping a workpiece and a second replaceable hand for grasping a cutting tool;

a workpiece support arranged adjacent said replaceable hand support;

a tool support arranged adjacent said tool magazine to removably support thereon a plurality of spare cutting tools each for use in place of one of cutting tools being stored in said tool magazine;

a robot provided independently of said machining center and adapted to be equipped selectively with said first and second replaceable hands on said replaceable hand support, said robot being operable with said first replaceable hand for replacing a finished workpiece on a pallet unloaded to the loading and unloading station of said pallet pool with a fresh workpiece on said workpiece support when at a first position and being also operable with said second replaceable hand for replacing a defective or damaged cutting tool in said tool magazine with a corresponding one of the spare cutting tools on said tool support when at a second position; and transfer means including a horizontally movable table carrying thereon said robot for transferring said robot between said first position which enables said robot to reach said workpiece support and said loading and unloading station and said second position which enables said robot to reach said tool support and said tool magazine.

2. A tool and workpiece change system as claimed in claim 1, wherein said replaceable hand support carries thereon a plurality of first replaceable hands for selectively grasping a plurality of different workpieces and a single second replaceable hand for selectively grasping said defective or damaged cutting tool and said corresponding one of said spare cutting tools, and wherein said replaceable hand support is located at such a position as to enable said robot to reach said replaceable hand support when said robot is at said first position.

3. A tool and workpiece change system as claimed in claim 2, wherein said robot when at each of the first and second positions is operable in a space surrounded by said machining center, said loading and unloading station of said pallet pool, said replaceable hand support, said workpiece support and said tool support.

* * * * *